UNITED STATES PATENT OFFICE.

CHARLES B. CLARK, OF NEW BRITAIN, CONNECTICUT, ASSIGNOR OF ONE-HALF TO HENRY G. BURTON, OF THE UNITED STATES ARMY.

COMPOSITION FOR CLEANING THE TEETH.

SPECIFICATION forming part of Letters Patent No. 396,192, dated January 15, 1889.

Application filed November 7, 1887. Serial No. 254,560. (No specimens.)

*To all whom it may concern:*

Be it known that I, CHARLES B. CLARK, a citizen of the United States, residing at New Britain, in the county of Hartford and State of Connecticut, have invented certain new and useful Improvements in Dentifrices; and I do hereby declare the following to be a full, clear, and exact description of the invention, such as will enable others skilled in the art to which it appertains to make and use the same.

My invention relates to a new dentifrice composition for cleaning and preserving the teeth, as also purifying the gums and interior parts of the mouth; and my said invention consists, first, in compounding menthol with a suitable adjuvant, corrective, and vehicle; and, second, in compounding glycerine with the mass to make a paste thereof, as will hereinafter be more fully described, and form the subject-matter of the appended claims.

The following is the preferable formula for my composition for dentifrice: precipitated lime or chalk, two pounds; pulverized soap, four ounces; pulverized orris-root, six ounces; pulverized sugar, twelves ounces; pulverized cuttle-fish bone, two ounces; oil of winter-green, two drams; oil of cinnamon, one dram; extract of vanilla, four drams; carmine, twenty-five grains; menthol, fifty, grains; alcohol sufficient to dissolve the menthol; glycerine, eight ounces; water, sixteen ounces.

The above-mentioned ingredients are thoroughly mixed and incorporated to make a moist powder or paste.

The basis or principal active agent in this composition is the menthol, whose properties are antiseptic, cleansing, cooling, and anodyne. The adjuvants, as well as the vehicle, are the lime, soap, orris-root, and cuttle-fish bone, which, by their abrading action upon the teeth and favorable action on the gums, as well as being antacid, aid the basis in its operation of cleansing the teeth, gums, and mouth. The sugar, oil of winter-green, cinnamon, and extract of vanilla merely act as correctives or perfumes and flavorings. The carmine is employed to impart a pleasing color to the mass.

Instead of all of these abrading substances— viz., the lime, soap, and cuttle-fish bone—being used, only one or two of them may be employed, or any other suitable abrading substance or substances may be substituted in place thereof—chalk, magnesia, or pumice-stone, for instance, being substituted for the lime and cuttle-fish bone, and powdered amole or soap-weed root for the soap. The orris-root, as well as the sugar and carmine, may also, one or all, be omitted without affecting the action of the other ingredients, and in place of the oil of winter-green and cinnamon oil of rose or lavender may be used, and the extract of vanilla may be omitted or other extract employed in place thereof, or only one such oil or extract be used instead of several, as herein mentioned.

The diluted glycerine employed in this formula, in addition to its use for preserving the mass in a plastic condition and preventing changes therein, is also efficacious in allaying fever of the mouth and gums and aiding in the cure of any irritation and soreness of these parts. It also assists in the operation of cleaning the teeth.

As will be noted, this dentifrice is in the form of a paste. If a powder is desired, the diluted glycerine is omitted, and instead of employing the exact formula herein given a dentifrice may be prepared (with or without the addition of glycerine to form a paste thereof) by compounding precipitated chalk, orris-root, oil of winter-green, and menthol; or chalk, pulverized soap, oil of cinnamon, and menthol; or simply the basis, menthol, an adjuvant—such as orris-root, soap, chalk, lime, magnesia, or pumice-stone—and with or without a corrective—such as sugar or flavors and odors—may be employed with good effect. I do not, therefore, wish to be understood as limiting myself to the precise formula herein given; but such formula is preferred, because it has been found to accomplish the desired result in a satisfactory manner.

If it is desired to have the dentifrice in liquid form, the following formula is employed, which, it will be observed, is substantially the equivalent of the formula hereinbefore mentioned, omitting the glycerine, viz: soap-bark, cinnamon-bark, white-oak bark, pellitory-root, orris-root, benzoic acid, of each one ounce; cochineal, three drams; borax, four scruples; oil of sassafras, three drams; menthol, two drams; alcohol, three pints; water, five pints; sugar, sixteen ounces.

Percolate barks and roots with menstruum, dissolve soluble substances in the percolate, and filter.

Having thus fully described my invention, together with the manner of preparing and compounding the same, what I claim as new therein, and desire to secure by Letters Patent of the United States, is as follows, to wit:

1. A composition for a dentifrice, consisting of menthol and abrading substance, substantially in the proportions specified.

2. A composition for a dentifrice, consisting of menthol, glycerine, and abrading substance, substantially in the proportions specified.

3. A composition for a dentifrice, consisting of menthol, glycerine, abrading substance, flavor, and odor, substantially in the proportions specified.

CHARLES B. CLARK.

Witnesses:
JOHN D. HUMPHREY,
LYMAN S. BURR.